United States Patent
Hsu et al.

(10) Patent No.: US 8,072,562 B2
(45) Date of Patent: Dec. 6, 2011

(54) LIQUID CRYSTAL PANEL AND LIQUID CRYSTAL MIXTURE

(75) Inventors: Shih-Feng Hsu, Taoyuan County (TW); Wei-Yi Chien, Keelung (TW); Kuo-Hwa Wu, Hsinchu (TW); Rong-Ching Yang, Hsinchu County (TW); Ming-Hung Wu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 670 days.

(21) Appl. No.: 12/260,079

(22) Filed: Oct. 28, 2008

(65) Prior Publication Data

US 2010/0066959 A1    Mar. 18, 2010

(30) Foreign Application Priority Data

Sep. 15, 2008 (TW) ............... 97135337 A

(51) Int. Cl.
*G02F 1/13* (2006.01)
(52) U.S. Cl. ........................................... 349/86
(58) Field of Classification Search .............. 349/86
See application file for complete search history.

(56) References Cited

U.S. PATENT DOCUMENTS 5,877,834 A    3/1999  Sako et al.
2007/0268434 A1*  11/2007  Huang et al. ............ 349/129

FOREIGN PATENT DOCUMENTS

| JP | 02-086692 | 3/1990 |
| JP | 11-295740 | 10/1999 |
| JP | 2002-040402 | 2/2002 |
| WO | 97/23524 | 7/1997 |

* cited by examiner

*Primary Examiner* — Phu Vu
(74) *Attorney, Agent, or Firm* — Jianq Chyun IP Office

(57) ABSTRACT

A liquid crystal panel including a first substrate, a second substrate, a liquid crystal layer disposed between the first substrate and the second substrate, a counter electrode, a pixel array structure, at least one alignment layer and at least one polymer layer is provided. The counter electrode is disposed between the liquid crystal layer and the first substrate. The pixel array structure is disposed between the liquid crystal layer and the second substrate. The alignment layer is disposed between the counter electrode and the liquid crystal layer and between the pixel array structure and the liquid crystal layer. The polymer layer is disposed between the alignment layer and the liquid crystal layer, and a material of the polymer layer includes polymer monomers and polymethyl methacrylate (PMMA). A content of PMMA in the polymer layer is greater than 1 ppm and smaller than 15000 ppm.

13 Claims, 5 Drawing Sheets

LIQUID CRYSTAL PANEL AND LIQUID CRYSTAL MIXTURE

CROSS-REFERENCE TO RELATED APPLICATION

This application claims the priority benefit of Taiwan application Ser. No. 97135337, filed on Sep. 15, 2008. The entirety of the above-mentioned patent application is hereby incorporated by reference herein and made a part of this specification.

BACKGROUND OF THE INVENTION

1. Field of the Invention

The present invention relates to a liquid crystal display (LCD) panel. More particularly, the present invention relates to an LCD panel having a polymer layer for assisting alignment.

2. Description of Related Art

Fabrication of an LCD includes fabricating an LCD panel and assembling a liquid crystal module (LCM). The fabrication of the LCD panel is mainly to package a liquid crystal layer between a color filter substrate and a pixel array substrate. To arrange liquid crystal molecules in a specific inclination angle to achieve a wide viewing angle display effect, an alignment structure is generally applied to the LCD panel.

The commonly used alignment structure includes alignment protrusions and alignment slits disposed on an electrode. The liquid crystal molecules in the liquid crystal layer can be arranged in multi-domain alignment by applying the alignment protrusions and the alignments slits, so as to achieve the wide viewing angle display effect. However, the liquid crystal molecules located around the alignment protrusions and the alignment slits generally represent in an ambiguous disclination, which may lead to dark stripes in the bright-state or light leakage in the dark-state so that a display contrast of the LCD panel is decreased. Therefore, a polymer stablilized alignment (PSA) technique is brought forward.

According to the PSA technique, monomers are first doped into the liquid crystal layer located between the color filter substrate and the pixel array substrate, and a specific voltage is applied to the liquid crystal layer. Meanwhile, the liquid crystal layer is irradiated by ultra violet (UV) light under such specific voltage. Now, the monomers are polymerised and cured to form polymer layers at two sides of the liquid crystal layer. The molecules of the polymer layer have a specific configuration, which avails alignment of the liquid crystal molecules. The arrangement of the liquid crystal molecules can be more stable according to the PSA technique, and applying of the alignment protrusions is unnecessary, so that the LCD panel is not liable to have the problems of dark stripes in the bright-state or light leakage in the dark-state, and transmissivity of the LCD panel is improved.

However, when the monomers are irradiated by the UV light to form the polymer layer, the monomers have to absorb enough energy for polymerization. Therefore, during the PSA process, an exposure time has to be long enough for performing the polymerization. In other words, productivity is influenced due to the relatively long exposure time of the PSA process.

In detail, if the exposure time is inadequate, curing of the monomers is incomplete, so that alignment of the liquid crystal molecules cannot be effectively assisted. Therefore, a response time and performance of the LCD panel are restrained. If the exposure time is suitably prolonged, the response time and performance of the liquid crystal molecules can be meliorated. However, on the other hand, the productivity of the LCD panel is restrained and the contrast of the LCD panel is decreased. Therefore, the PSA technique requires to be further improved.

SUMMARY OF THE INVENTION

The present invention is directed to a LCD panel, in which liquid crystal molecules have a relatively short response time.

The present invention is directed to a liquid crystal mixture, which requires a relatively short exposure time during polymerization.

The present invention provides an LCD panel including a first substrate, a second substrate, a liquid crystal layer, a counter electrode, a pixel array structure, at least one alignment layer and at least one polymer layer. The liquid crystal layer is disposed between the first substrate and the second substrate. The counter electrode is disposed between the liquid crystal layer and the first substrate. The pixel array structure is disposed between the liquid crystal layer and the second substrate. The alignment layer is disposed between the counter electrode and the liquid crystal layer and between the pixel array structure and the liquid crystal layer. The polymer layer is disposed between the alignment layer and the liquid crystal layer, wherein a material of the polymer layer includes polymethyl methacrylate (PMMA), and a content of PMMA in the polymer layer is greater than 1 ppm and less than 15000 ppm.

In an embodiment of the present invention, the content of PMMA in the polymer layer is less than 5000 ppm.

In an embodiment of the present invention, the content of PMMA in the polymer layer is 500 ppm.

In an embodiment of the present invention, the material of the polymer layer further includes alkyl derivatives of PMMA.

In an embodiment of the present invention, a material of the alignment layer includes polyimide.

In an embodiment of the present invention, the polymer layer further includes a plurality of polymers polymerized from a plurality of light-polymerizable monomers, a plurality of thermal-polymerizable monomers or a combination thereof. To be specific, materials of the polymers polymerized from the polymerizable monomers include acrylate resin, methyl acrylate resin, vinyl resin, vinyloxy resin, epoxy resin or combinations thereof.

The present invention also provides a liquid crystal mixture including a liquid crystal material and a mixed material. The mixed material is evenly mixed with the liquid crystal material, wherein the mixed material includes a plurality of polymerizable monomer molecules and PMMA, and a content of PMMA in the mixed material is greater than 1 ppm and less than 15000 ppm.

In an embodiment of the present invention, the content of PMMA in the mixed material is less than 5000 ppm.

In an embodiment of the present invention, the content of PMMA in a polymer layer is 500 ppm.

In an embodiment of the present invention, the material of the mixed material further includes alkyl derivatives of t PMMA.

In an embodiment of the present invention, the polymerizable monomer molecules are a plurality of light-polymerizable monomer molecules, a plurality of thermal-polymerizable monomer molecules or a combination thereof.

In an embodiment of the present invention, a material of the polymerizable monomer molecules includes acrylate resin monomer molecules, methyl acrylate resin monomer molecules, vinyl resin, vinyloxy resin monomer molecules, epoxy resin monomer molecules or combinations thereof.

In the present invention, since PMMA is added to the liquid crystal mixture, an exposure time required for a PSA process is relatively short. Moreover, the response time of the liquid crystal molecules of the LCD panel is relatively short, so that the LCD panel of the present invention has relatively high display quality.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
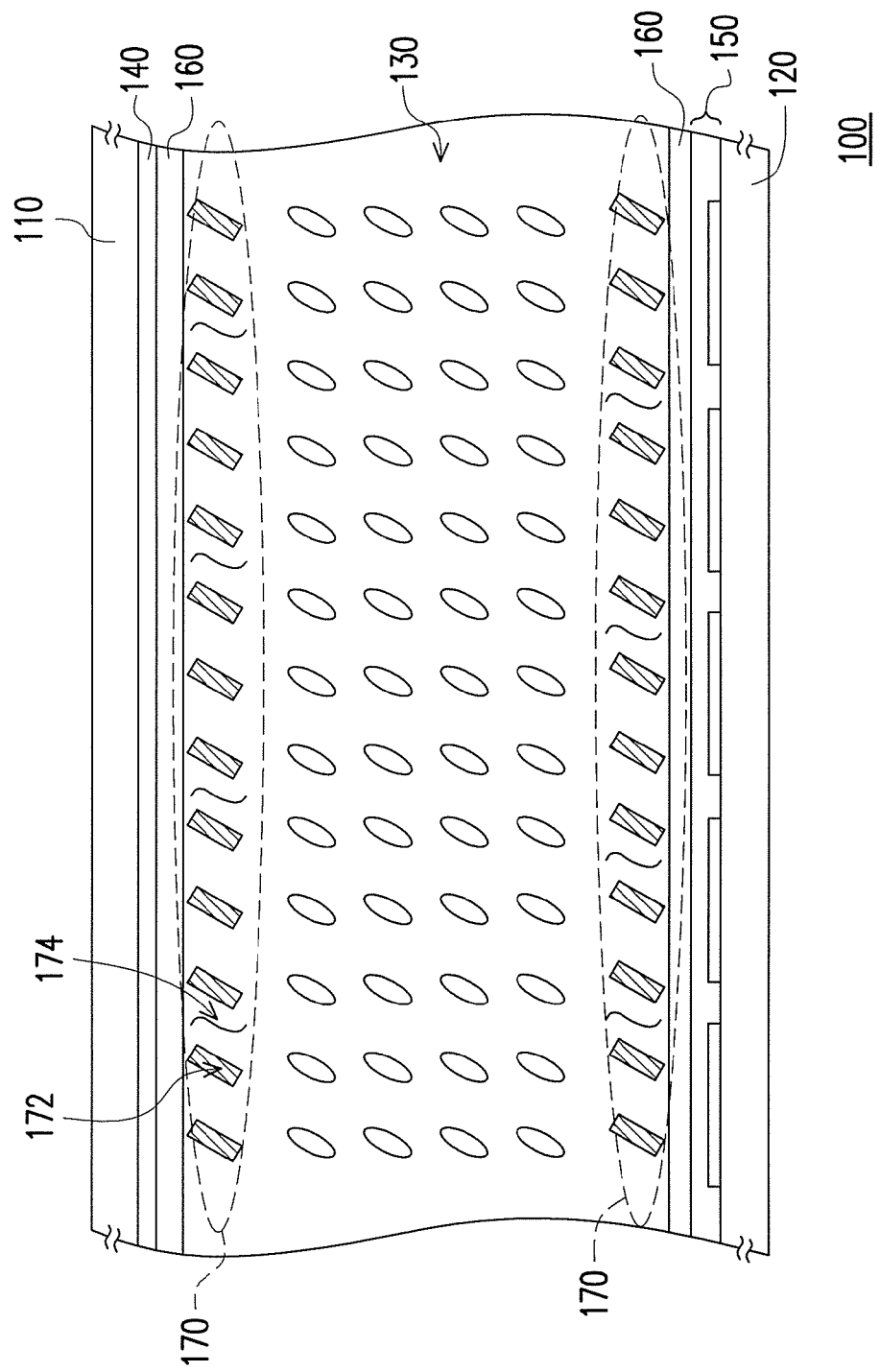
FIG. 1 is a schematic diagram illustrating an LCD panel according to an embodiment of the present invention.

FIG. 1 is a schematic diagram illustrating a LCD panel according to an embodiment of the present invention. Referring to FIG. 1, the LCD panel 100 includes a first substrate 110, a second substrate 120, a liquid crystal layer 130, a counter electrode 140, a pixel array structure 150, at least one alignment layer 160 and at least one polymer layer 170. The liquid crystal layer 130 is disposed between the first substrate 110 and the second substrate 120. The counter electrode 140 is disposed between the liquid crystal layer 130 and the first substrate 110. The pixel array structure 150 is disposed between the liquid crystal layer 130 and the second substrate 120. Moreover, the alignment layer (or referred to as bottom alignment layer) 160 is disposed between the counter electrode 140 and the liquid crystal layer 130 and between the pixel array structure 150 and the liquid crystal layer 130. The polymer layer (or referred to as polymer stabilized alignment (PSA) layer or top alignment layer) 170 is disposed between the alignment layer 160 and the liquid crystal layer 130, wherein the polymer layer 170 has polymethyl methacrylate (PMMA) 174, and a content of PMMA 174 in the polymer layer 170 is greater than 1 ppm and less than 15000 ppm.

In the present embodiment, the alignment layer 160 for example includes two layers respectively located on a top side and a bottom side of the liquid crystal layer. Meanwhile, two layers of the polymer layer 170 are taken as an example in the present embodiment, though the present invention is not limited thereto.

In the present embodiment, the content of PMMA 174 in the polymer layer 170 is less than 5000 ppm. Moreover, the material of the polymer layer 170 can further include alkyl derivatives of PMMA. In addition, the polymer layer 170 further includes a plurality of polymers 172 polymerized from a plurality of light-polymerizable monomer molecules, a plurality of thermal-polymerizable monomer molecules or a combination thereof. In the present embodiment, the polymerizable monomer molecules include acrylate resin monomer molecules, methyl acrylate resin monomer molecules, vinyl resin monomer molecules, vinyloxy resin monomer molecules, epoxy resin monomer molecules or combinations thereof.

The polymerizable monomer molecules can be selected from one of compounds I, II and III, and the compound I is represented by a following formula:

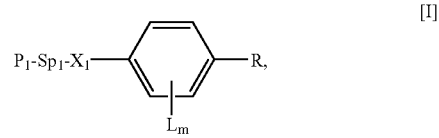

[I]

the compound II is represented by a following formula:

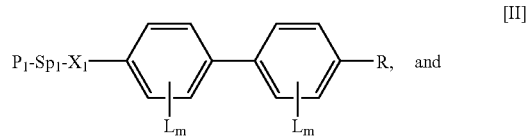

[II]

and the compound III is represented by a following formula:

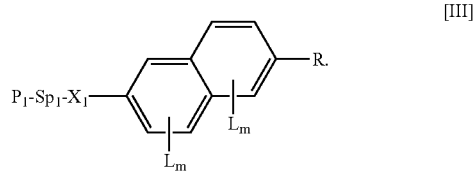

[III]

Herein, "R" is a hydrogen atom, a fluorine atom, a chlorine atom, a cyano group (—CN), a thiocyanato (—SCN), a pentafluoro-lambda~6~-sulfanyl (—SF5H), a nitrite (—NO2), a straight-chain or branched-chain alkyl group having 1 to 12 carbon atoms or a X2-SP2-P2 group. When "R" of the polymerizable monomer is the straight-chain or branched-chain alkyl group having 1 to 12 carbon atoms, one or two nonadjacent —CH2- thereof can be substituted by an oxygen atom, a sulfur atom, a vinylene (—CH=CH—), a carbonyl (C=O), a carboxyl (—COO—), a carbothio (S—CO—, —CO—S—) or an alkyne. Wherein, "R" is preferably an X2-SP2-P2 group which is symmetric to the X1-SP1-P1 group.

"X1" and "X2" are respectively an oxygen atom, a sulfur atom, a methyoxy (—OCH2-), a carbonyl (C=O), a carboxyl (—COO—), a carbamoyl (—CO—N0R—, —N0R—CO—), a methylthio (—CH2S—, —SCH2-), an ethenylcarbonyl (—CH=CH—COO—), a carbonylethenyl (—COO—CH=CH—) or a single bond.

"Sp1" and Sp2" are individually a spacing group or a single bond.

"Lm" are respectively a hydrogen atom, a fluorine atom, a chlorine atom, a cyano group, an alkyl, an alkylcarbonyl, an alkoxycarbonyl or an alkylcarbonyloxy having 1 to 7 carbon atoms, wherein m≧1 When "Lm" of the polymerizable monomer is the alkylcarbonyloxy having 1 to 7 carbon atoms, one or more hydrogen atoms thereof can be substituted by fluorine atoms or chlorine atoms.

"P1" and "P2" are respectively a polymerizable group, and the polymerizable group can be selected from one of the groups VI, VII, VIII, IX and X. The group VI can be represented by a following chemical formula, wherein "U" is one of a hydrogen atom, a methyl, a fluorine atom, a trifluoromethyl (—CF3) and a phenyl.

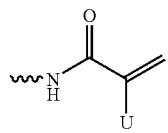

[VI]

The group VII can be represented by a following chemical formula, wherein "T" is one of a hydrogen atom, a methyl, a fluorine atom, a trifluoromethyl (—CF3) and a phenyl.

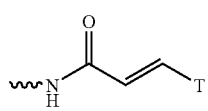

[VII]

The group VIII is pyrrole-2,5-dione, which is represented by a following chemical formula:

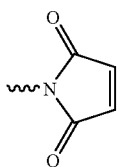

[VIII]

The group IX can be represented by a following chemical formula, wherein "Y" is one of a hydrogen atom, a methyl, a fluorine atom, a trifluoromethyl (—CF3) and a phenyl.

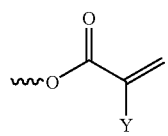

[IX]

The group X can be represented by a following chemical formula, wherein "M" is one of a hydrogen atom, a methyl, a fluorine atom, a trifluoromethyl (—CF3) and a phenyl.

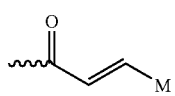

[X]

An example for the polymerizable monomer molecules is represented by a following chemical formula.

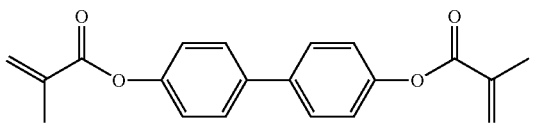

In the present embodiment, a material of the polymers 172 polymerized from polymerizable monomers includes acrylate resin, methyl acrylate resin, vinyl resin, vinyloxy resin, epoxy resin or combinations thereof. Moreover, a material of the alignment layer 160 includes polyimide.

Generally, the polymer layer 170 can only be formed by the polymers 172. However, the adhesion between the polymer 172 formed by the polymerised monomer molecules and the polyimide is not desirable so that the alignment effect provided by the polymer layer 170 is limited. Thus, the polymer layer 170 only formed by the polymers 172 may have an undesired influence on the response time of the liquid crystal molecules within the liquid crystal layer 130. Therefore, in addition to the polymer 172, PMMA 174 is further added to the polymer layer 170 of the present embodiment to improve the adhesion between the alignment layer 160 and the polymer layer 170. By such means, the response time of the liquid crystal molecules within the liquid crystal layer 130 can be shortened, so that the LCD panel 100 may have a good display quality.

Figure 2A:
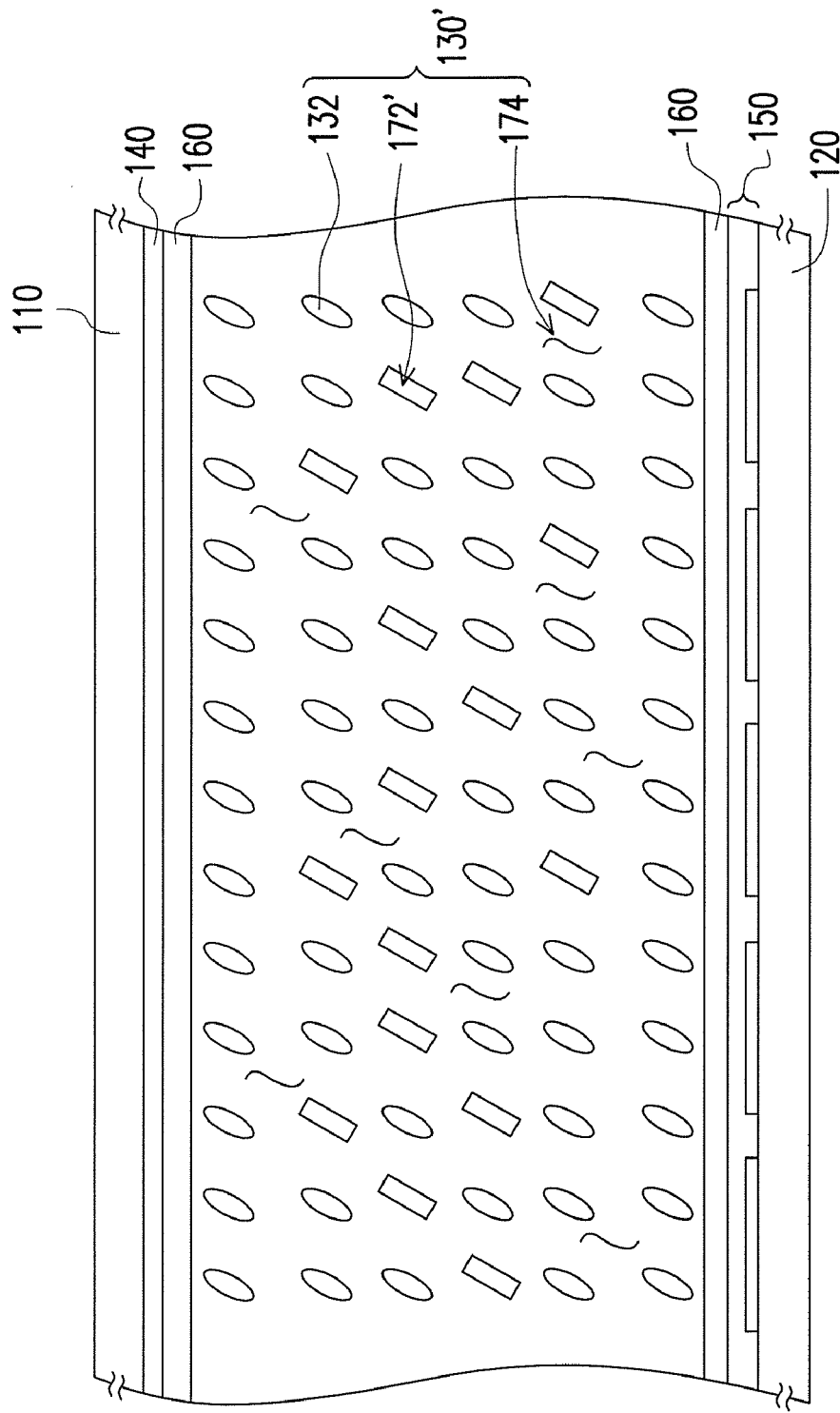
FIG. 2A and FIG. 2B are schematic diagrams illustrating two steps of a curing process according to an embodiment of the present invention.
Figure 2B:
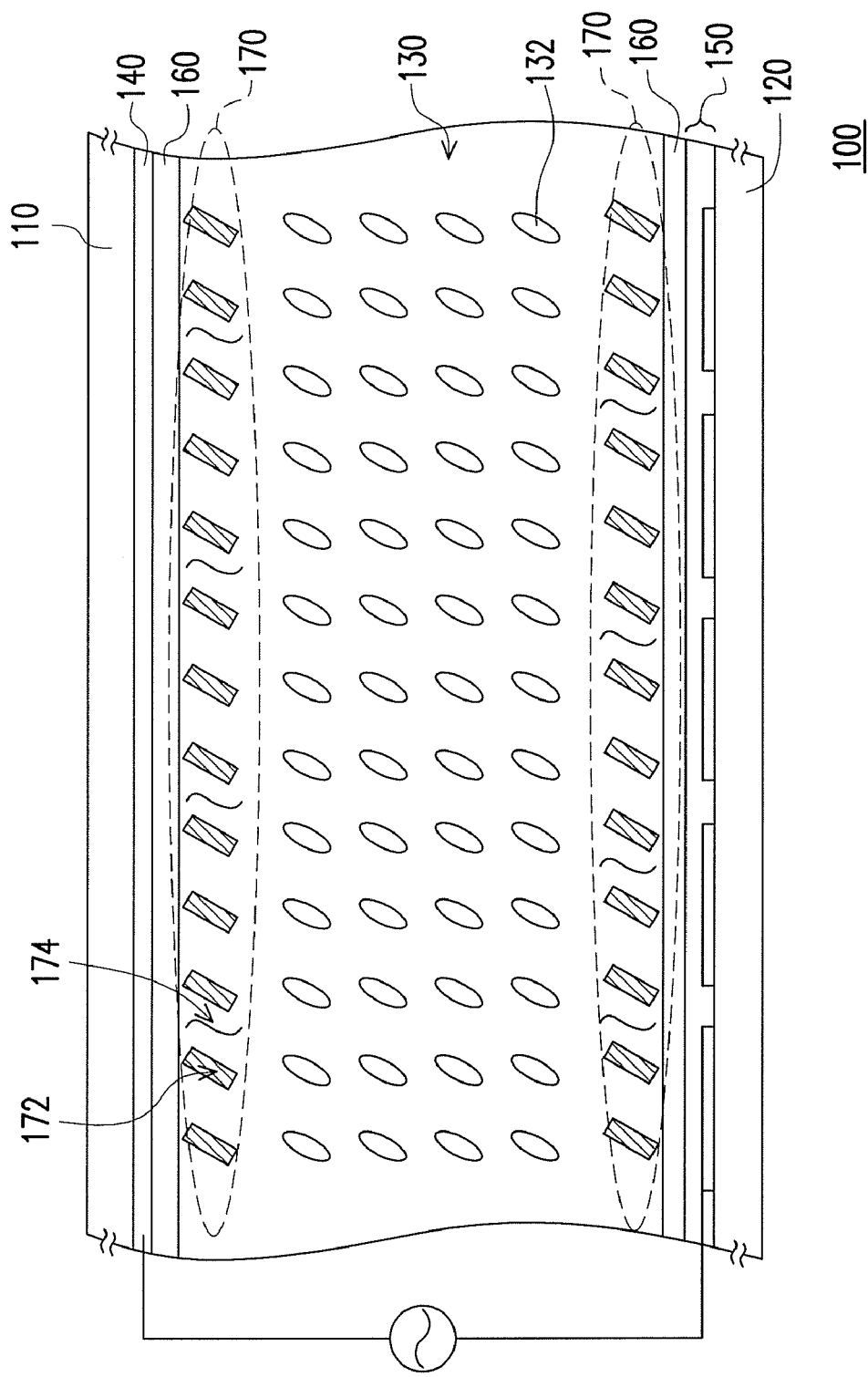

In detail, FIG. 2A and FIG. 2B are schematic diagrams illustrating a fabrication process of an LCD panel according to an embodiment of the present invention. Referring to FIG. 2A, liquid crystal molecules 132, polymerizable monomer molecules 172' first and PMMA 174 are mixed and disposed between the first substrate 110 and the second substrate 120. Here, the mixture of the liquid crystal molecules 132, the polymeriable monomer molecules 172' and PMMA 174 is for example, referred to as liquid crystal mixture 130'.

Next, referring to FIG. 2A and FIG. 2B, a specific electric field is applied between the first substrate 110 and the second substrate 120. Meanwhile, under a function of the above electric field, the polymerizable monomer molecules 172' are polymerized to form the polymers 172. After the polymers 172 are cured, the polymer layers 170 are formed on the first substrate 110 and the second substrate 120 located at two opposite sides of the liquid crystal layer 130. Now, fabrication of the LCD panel 100 is completed.

The liquid crystal molecules 132 may be arranged in a specific arrangement under the function of the electric field, and now if the polymer 172 is cured, the polymer layer 170 can have a specific configuration. When the electric field is removed, the specific configuration of the polymer layer 170 can provide a specific anchor force to avail the liquid crystal molecules 132 arranged in a specific pre-tilt angle. Therefore, the LCD panel 100 can have a good display effect. Moreover, in the present embodiment, the method of polymerizing the polymerizable monomer molecules 172' is for example, a lighting method or a heating method. If the polymerizable monomer molecules 172' are the light-polymerizable molecules, the light-irradiating method is applied to the fabrication process of FIG. 2B, and if the polymerizable monomer molecules 172' are the thermal-polymerizable molecules, the heating method can be applied to polymerize the polymerizable monomer molecules 172'. Though the present invention is not limited thereto, if another kind of the polymerized monomer molecules 172' is selected in other embodiments, a suitable fabrication process is then selected according to a molecular nature of the polymerizable monomer molecules 172'.

It should be noted that when the polymer layer 170 is fabricated, besides the polymerizable monomer molecules 172', PMMA 174 is further added in the liquid crystal mixture 130'. PMMA 174 can not only increase a solubility of the polymerizable monomer molecules 172' mixed with the liquid crystal molecules 132 so as to improve a uniformity of the polymer layer 170, but can also improve the adhesion between the polymers 172 and the alignment layer 170. Therefore, after the polymerizable monomer molecules 172' are polymerized to become the polymers 172, they can be easily cured to form the polymer layer 170 for shortening the exposure time. By such means, not only a fabrication time is saved, but also the LCD panel 100 may have a better display contrast effect.

Figure 3A:
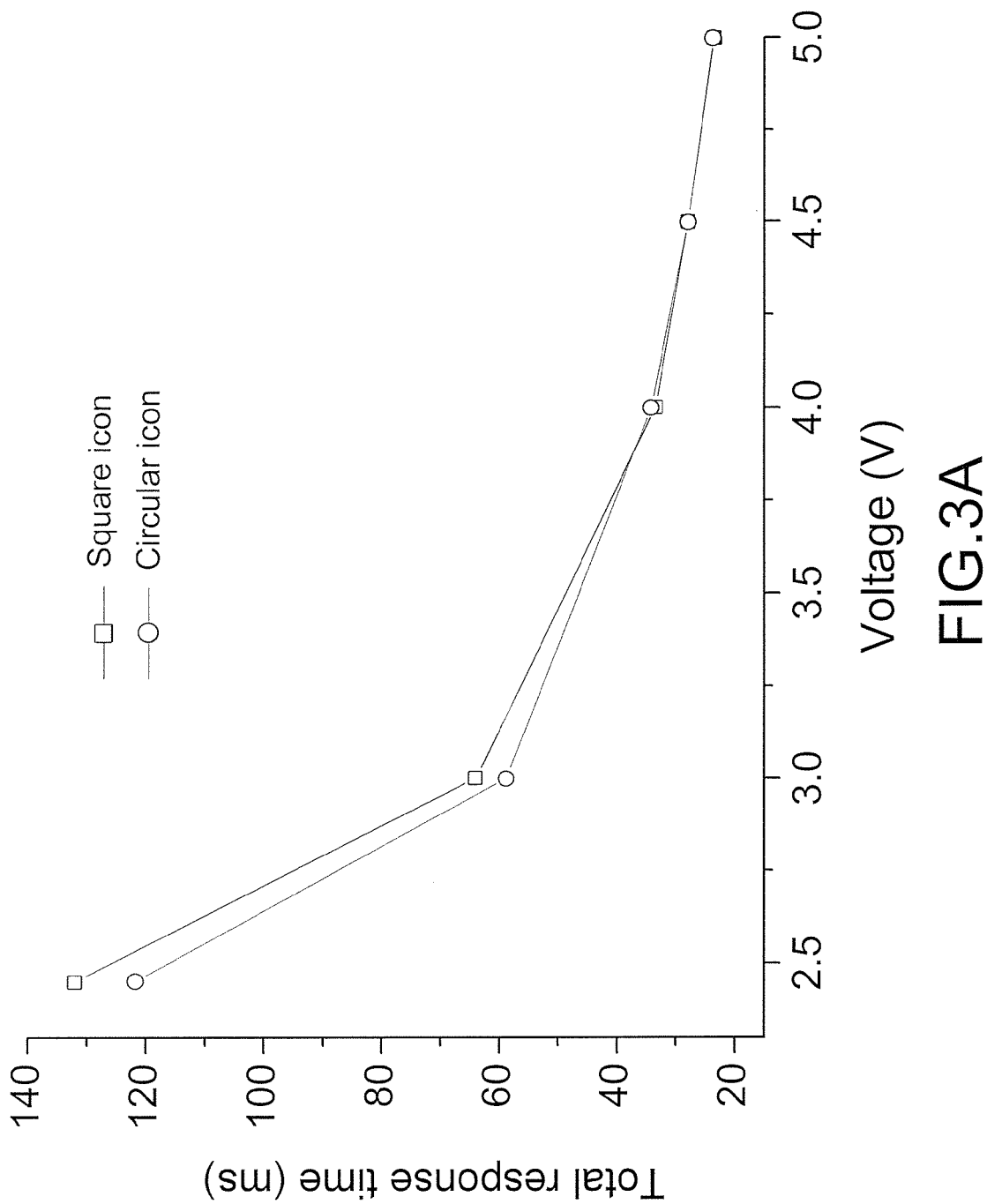
FIG. 3A is a comparison diagram illustrating response time of an LCD panel of the present embodiment and a conventional LCD panel when liquid crystal molecules thereof are changed from a standby state to a display state and again changed to the standby state under different voltages.
Figure 3B:
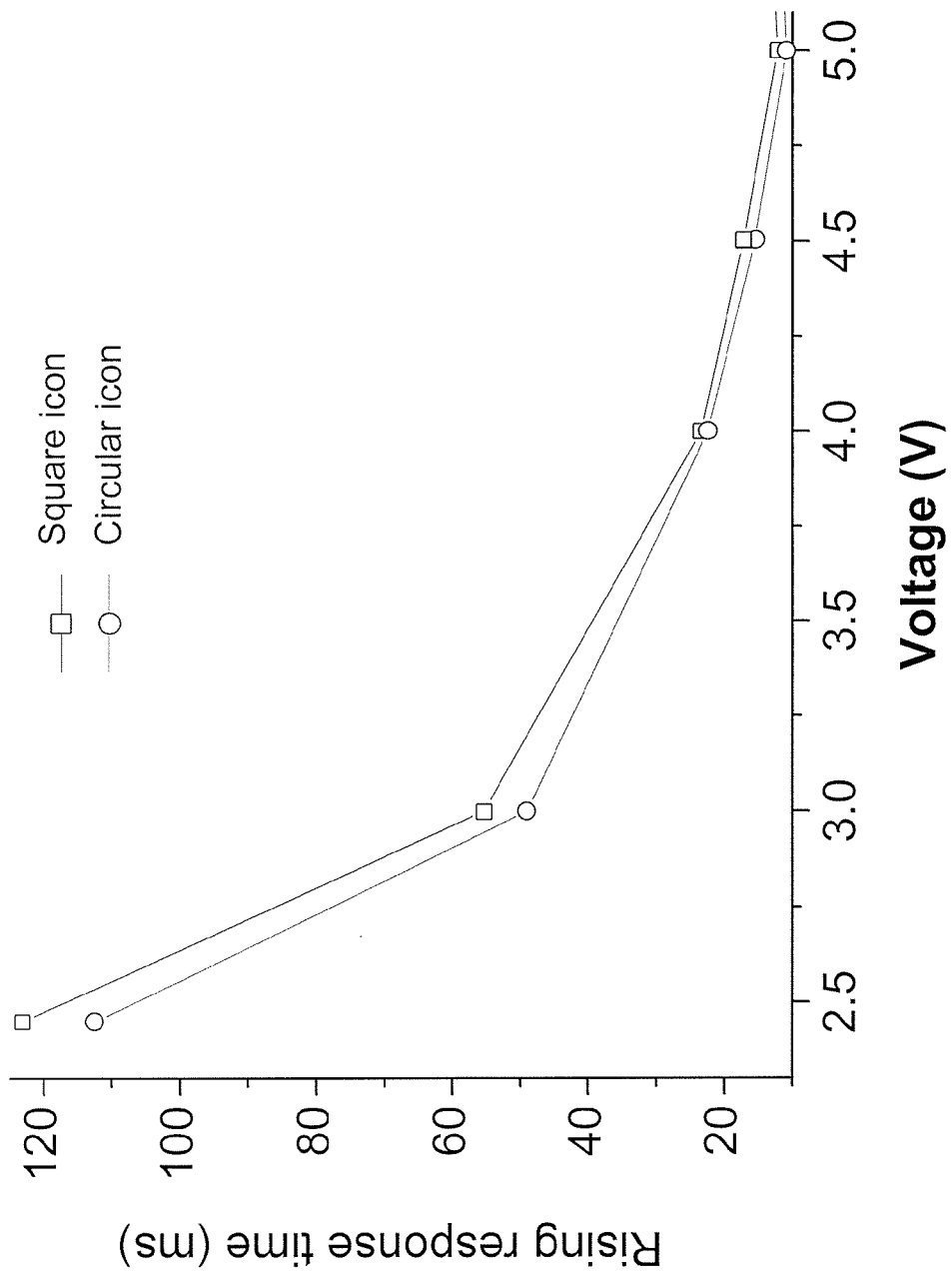
FIG. 3B is a comparison diagram illustrating time required by an LCD panel of the present embodiment and a conventional LCD panel when liquid crystal molecules thereof are changed from a standby state to a display state under different voltages.

FIG. 3A is a comparison diagram illustrating response time of an LCD panel of the present embodiment and a conventional LCD panel when liquid crystal molecules thereof are changed from a standby state to a display state and again changed to the standby state under different voltages. FIG. 3B is a comparison diagram illustrating time required by a LCD panel of the present embodiment and a conventional LCD panel when liquid crystal molecules thereof are changed from a standby state to a display state under different voltages. Referring to FIG. 3A and FIG. 3B, in the present embodiment, circular icons represent the LCD panel of the present invention, and the polymer layer thereof is fabricated based on a liquid crystal mixture containing 0.3% polymerizable monomer molecules and 0.05% PMMA. Square icons represent the conventional LCD panel, and the polymer layer thereof does not contain PMMA. As shown in FIG. 3A and FIG. 3B, it is obvious that in case of different concentrations of the polymerizable monomer molecules, by adding PMMA with a very low concentration (for example, 500 ppm), the response time of the liquid crystal molecules of the LCD panel can be shortened. Particularly, in the case of low voltages, differences of the response time of the liquid crystal molecules in the two LCD panels are more significant.

In summary, the liquid crystal mixture of the present invention includes the liquid crystal, polymerised monomer molecules, and PMMA or allyl derivatives of PMMA. PMMA or alkyl derivatives of PMMA avails improving the adhesion between the polymerised monomer molecules and the alignment layer. Therefore, during the PSA process for fabricating the LCD panel, the required exposure time can be reduced. Moreover, performance of the response time of the liquid crystal molecules in the LCD panel can be more desirable.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display (LCD) panel, comprising:
   a first substrate;
   a second substrate;
   a liquid crystal layer, disposed between the first substrate and the second substrate;
   a counter electrode, disposed between the liquid crystal layer and the first substrate;
   a pixel array structure, disposed between the liquid crystal layer and the second substrate;
   at least an alignment layer, disposed between the counter electrode and the liquid crystal layer, and between the liquid crystal layer and the pixel array structure; and
   at least a polymer layer, disposed between the alignment layer and the liquid crystal layer, wherein a material of the polymer layer comprises polymethyl methacrylate (PMMA), and a content of PMMA in the polymer layer is greater than 1 ppm and less than 15000 ppm.

2. The LCD panel as claimed in claim 1, wherein the content of PMMA in the polymer layer is less than 5000 ppm.

3. The LCD panel as claimed in claim 1, wherein the content of PMMA in the polymer layer is 500 ppm.

4. The LCD panel as claimed in claim 1, wherein the material of the polymer layer further comprises alkyl derivatives of the PMMA.

5. The LCD panel as claimed in claim 1, wherein a material of the alignment layer comprises polyimide.

6. The LCD panel as claimed in claim 1, wherein the polymer layer further comprises a plurality of polymers polymerized from a plurality of light-polymerizable monomer molecules, a plurality of thermal-polymerizable monomer molecules or a combination thereof.

7. The LCD panel as claimed in claim 6, wherein a material of the polymers comprises acrylate resin, methyl acrylate resin, vinyl resin, vinyloxy resin, epoxy resin or a combination thereof.

8. A liquid crystal mixture, comprising:
   a liquid crystal material; and
   a mixed material, evenly mixed with the liquid crystal material, wherein the mixed material comprises a plurality of polymerizable monomer molecules and polymethyl methacrylate (PMMA), and a content of PMMA in the mixed material is greater than 1 ppm and less than 15000 ppm.

9. The liquid crystal mixture as claimed in claim 8, wherein the content of PMMA in the mixed material is less than 5000 ppm.

10. The liquid crystal mixture as claimed in claim 8, wherein the content of PMMA in the mixed material is 500 ppm.

11. The liquid crystal mixture as claimed in claim 8, wherein the material of the mixed material further comprises alkyl derivatives of PMMA.

12. The liquid crystal mixture as claimed in claim 8, wherein the polymerizable monomer molecules are a plurality of light-polymerizable monomer molecules, a plurality of thermal-polymerizable monomer molecules or a combination thereof.

13. The liquid crystal mixture as claimed in claim 8, wherein the polymerizable monomer molecules comprises acrylate resin monomer molecules, methyl acrylate resin monomer molecules, vinyl resin monomer molecules, vinyloxy resin monomer molecules, epoxy resin monomer molecules or combinations thereof.

* * * * *